(12) United States Patent
Wu et al.

(10) Patent No.: US 12,707,099 B2
(45) Date of Patent: Aug. 11, 2026

(54) SCENE-ADAPTIVE ONLINE LEARNING FOR VIDEO POST PROCESSING

(71) Applicant: QUALCOMM Incorporated, San Diego, CA (US)

(72) Inventors: Junmin Wu, San Diego, CA (US); Khalid Tahboub, San Diego, CA (US); Scott Benjamin Leask, San Diego, CA (US); Jamie Menjay Lin, San Diego, CA (US); Kai Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/882,183

(22) Filed: Sep. 11, 2024

(65) Prior Publication Data

US 2026/0075255 A1 Mar. 12, 2026

(51) Int. Cl.
*H04N 19/86* (2014.01)
*H04N 19/142* (2014.01)
(Continued)

(52) U.S. Cl.
CPC ........... *H04N 19/86* (2014.11); *H04N 19/142* (2014.11); *H04N 19/172* (2014.11); *H04N 19/42* (2014.11);
(Continued)

(58) Field of Classification Search
CPC .... H04N 19/86; H04N 19/142; H04N 19/172; H04N 19/42; H04N 19/463; H04N 19/80; H04N 19/91
See application file for complete search history.

(56) References Cited

U.S. PATENT DOCUMENTS 10,999,606 B2 5/2021 Yin et al.
2008/0025402 A1 1/2008 Lee et al.
(Continued)

FOREIGN PATENT DOCUMENTS

CN 113038129 A * 6/2021 ........... H04N 19/154
CN 117909940 A * 4/2024 ............ G06N 3/084
(Continued)

OTHER PUBLICATIONS

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.
(Continued)

*Primary Examiner* — Tracy Y. Li
(74) *Attorney, Agent, or Firm* — QUALCOMM Incorporated

(57) ABSTRACT

A video capture device may be encode a set of original pictures to create encoded video data, decode the encoded video data to create a set of reconstructed pictures, determine a subset of parameters to update from among a plurality of parameters of a post-processing filter network, including using the set of original pictures as ground truth and the set of reconstructed pictures as input to the post-processing filter network, update the subset of parameters to generate updated parameters, and send the encoded video data and the updated parameters to a playback device.

26 Claims, 9 Drawing Sheets

(51) Int. Cl.
*H04N 19/172* (2014.01)
*H04N 19/42* (2014.01)
*H04N 19/463* (2014.01)
*H04N 19/80* (2014.01)
*H04N 19/91* (2014.01)

(52) U.S. Cl.
CPC ........... *H04N 19/463* (2014.11); *H04N 19/80* (2014.11); *H04N 19/91* (2014.11)

(56) References Cited

U.S. PATENT DOCUMENTS

| | | | | |
|---|---|---|---|---|
| 2022/0394288 | A1 | 12/2022 | Li et al. | |
| 2024/0244226 | A1* | 7/2024 | Li | H04N 19/154 |
| 2024/0291980 | A1* | 8/2024 | Ding | H04N 19/70 |

FOREIGN PATENT DOCUMENTS

| | | | | | |
|---|---|---|---|---|---|
| CN | 118675006 | A | * | 9/2024 | G06V 10/82 |
| CN | 118799175 | A | * | 10/2024 | G06T 5/80 |
| WO | WO-2021255605 | A1 | * | 12/2021 | G06N 3/047 |
| WO | 2022182265 | A1 | | 9/2022 | |

OTHER PUBLICATIONS

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Baydin A.G., et al., "Gradients without Backpropagation", arXiv:2202.08587v1 [cs.LG], Cornell University Library, 201 Olin Library Cornell University Ithaca, NY 14853, Feb. 17, 2022, 10 Pages, XP091161175, abstract, section 5.

International Search Report and Written Opinion PCT/US2025/044623 ISA/EPO Dec. 8, 2025.

Lam Y.H., et al., "Compressing Weight-Updates for Image Artifacts Removal Neural Networks", arXiv:1905.04079V2 [cs.LG], Cornell University Library, 201 Olin Library Cornell University Ithaca, NY 14853, May 10, 2019, pp. 4321-4325, XP081370895, the whole document.

Numpy Community: "Sections 1.1, 1.1.5, 4.2.2-4.2.4, 4.2.6, 4.15.1", Internet Citation, Jan. 31, 2021, 90 Pages, pp. 3-56, 525, XP009550211, pp. 782-783.

Santamaria M., et al., "Content-Adaptive Neural Network Post-Processing Filter with NNR-Coded Weight-Updates", 2022 IEEE International Conference on Image Processing (ICIP), IEEE, Oct. 16, 2022, pp. 2251-2255, XP034292858, the whole document.

Zhang H., et al., "Learn to Overfit Better: Finding the Important Parameters for Learned Image Compression", 2021 International Conference on Visual Communications and Image Processing (VCIP), IEEE, Dec. 5, 2021, 5 Pages, XP034069613, the whole document.

* cited by examiner

SCENE-ADAPTIVE ONLINE LEARNING FOR VIDEO POST PROCESSING

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (Por B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for processing video data, including techniques for post-processing video data using a post-processing filter network. In particular, this disclosure describes scene adaptive and online learning techniques for updating the parameters of the post-processing filter network.

In accordance with the techniques of this disclosure, a video capture device may encode video data and then may subsequently decode the video data to form reconstructed pictures. The video capture device may then process the reconstructed pictures with a post-processing filter network that is the same as a post-processing filter network that may be used at a video playback device. In particular, the video capture device may process the reconstructed picture with the post-processing filter network to determine a subset of parameters of the post-processing filter network to update.

In one example, the video capture device may use the original video data as ground truth and compare the filtered video data produced by applying the post-processing filter network to the reconstructed pictures to determine a loss function. The post-processing filter network may be trained based on this loss function. The video capture device may determine a subset of parameters of the post-processing filter network to update based on a result on this training. As one example, a certain percentage (e.g., 'n' percent) of parameters that have the largest accumulated gradient changes over the training process may be selected as parameters to update.

The video capture device may then update the values of the subset of parameters through a further training process, leaving all other parameters of the post-processing filter network fixed. The video capture device may then compress the updated parameters and send the compressed parameters to the video playback device along with the encoded video data. The video playback device may decode the encoded video data to form decoded video data. The video playback device may also decompress the updated parameters and then update the post-processing filter network of the video playback device with the updated parameters. The video playback device may then process the decoded video data with the post-processing filter network using the updated parameters.

By updating the parameters of the post-processing filter network based on the actual content being encoded, the post-processing filter network can be adapted to the actual content being encoded (i.e., the post-processing network is scene adaptive). Furthermore, the update of the post-processing network is "online" in that it occurs while video data is being actively processed. This scene-adaptive and online update of parameters may achieve lower levels of distortion at lower bitrates compared to standard video decoding with no post-processing and compared to video decoding using a post-processing filter network with fixed parameters.

In one example, this disclosure describes a method of processing video data at a capture device, the method comprising encoding a set of original pictures to create encoded video data, decoding the encoded video data to create a set of reconstructed pictures, determining a subset of parameters to update from among a plurality of parameters of a post-processing filter network, including using the set of original pictures as ground truth and the set of reconstructed pictures as input to the post-processing filter network, updating the subset of parameters to generate updated parameters, and sending the encoded video data and the updated parameters to a playback device.

In another example, this disclosure describes an apparatus configured to process video data at a capture device, the apparatus comprising a memory, and processing circuitry in communication with the memory, the processing circuitry configured to encode a set of original pictures to create encoded video data, decode the encoded video data to create a set of reconstructed pictures, determine a subset of parameters to update from among a plurality of parameters of a post-processing filter network, including using the set of original pictures as ground truth and the set of reconstructed pictures as input to the post-processing filter network, update the subset of parameters to generate updated parameters, and send the encoded video data and the updated parameters to a playback device.

In another example, this disclosure describes a method of processing video data at a playback device, the method comprising receiving encoded video data and encoded parameters for a post-processing filter network, decoding the encoded video data to generate a decoded picture, decoding the encoded parameters to recover updated parameters, and processing the decoded picture using the post-processing filter network and the updated parameters.

In another example, this disclosure describes an apparatus configured to process video data at a playback device, the apparatus comprising a memory, and processing circuitry in communication with the memory, the processing circuitry configured to receive encoded video data and encoded parameters for a post-processing filter network, decode the encoded video data to generate a decoded picture, decode the encoded parameters to recover updated parameters, and process the decoded picture using the post-processing filter network and the updated parameters to generate a filtered picture.

The details of one or more examples are set forth in the accompanying drawings and the description below. Other features, objects, and advantages will be apparent from the description, drawings, and claims.

DETAILED DESCRIPTION

Figure 1:
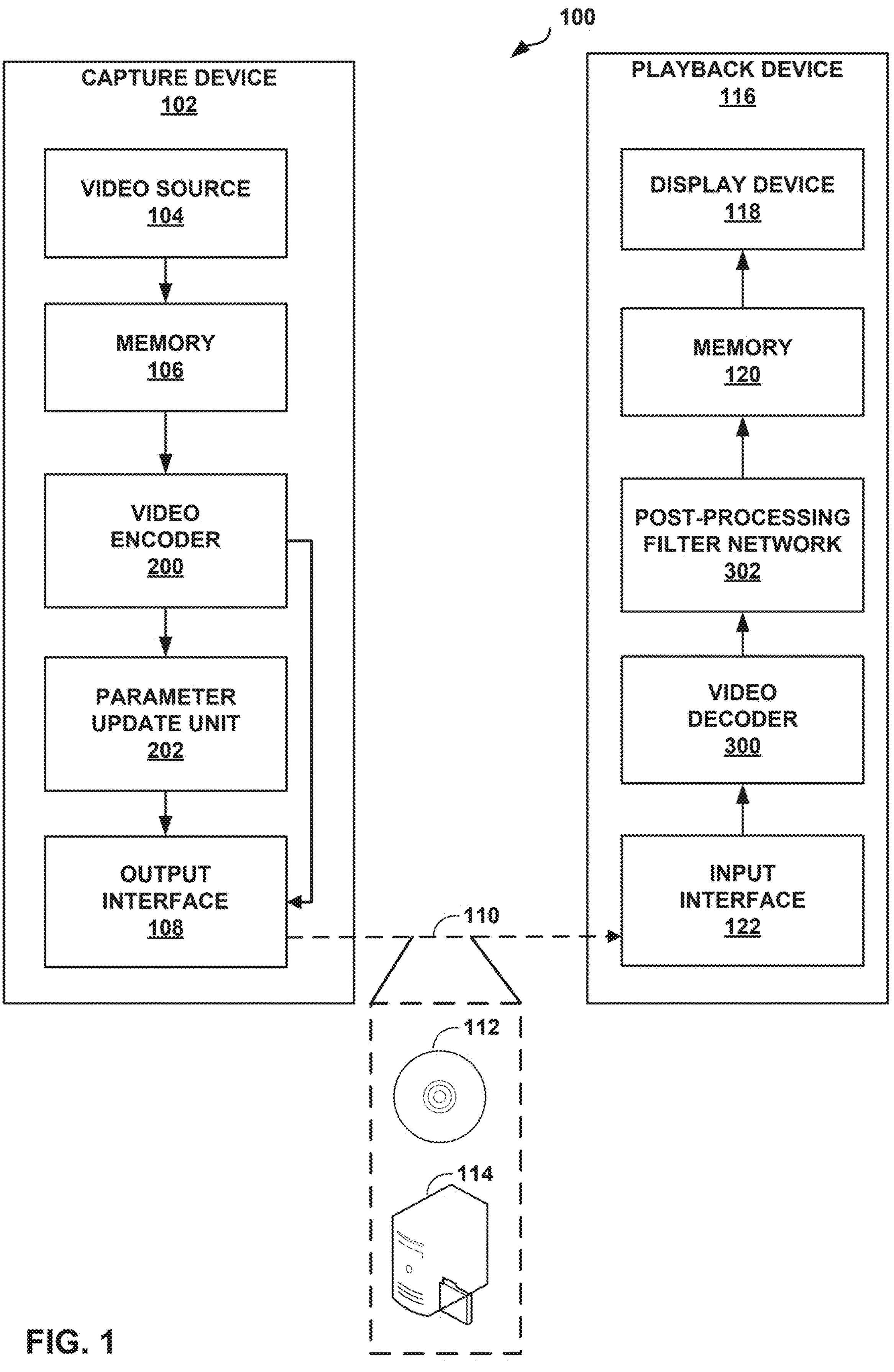
FIG. 1 is a block diagram illustrating an example video encoding and decoding system that may perform the techniques of this disclosure.

Video coding suffers from compression artifacts that degrade the visual quality of decoded pictures and that degrades the user experience. Types of compression artifacts include spatial artifacts and temporal artifacts. Spatial artifacts may include basis patterns, blocking, blurring, staircase blurring, color bleeding, and ringing. Temporal artifacts may include flicking (e.g., coarse-grain flickering, fine-grain flickering, and mosquito noise), jerkiness, and floating (e.g., edge floating and texture floating).

Video encoder and video decoder in-loop filters (e.g., deblocking filters) are limited to addressing specific noise and do not always address all types of noise effectively. Deep learning-based methods, such as filters based on convolutional neural networks, are good candidates to address and rectify such coding artifacts. Such deep learning methods are typically employed as post-processing rather than in-loop within the video coder. That is, a deep-learning-based filter is applied to decoded pictures before output, but such filtered pictures are not used in prediction processes (e.g., inter prediction) within the codec.

Existing deep learning-based post processing methods are deployed as stand-alone components and are often sub-optimal, as such post processing methods handle various use cases that include varying content, resolution, sensors, light conditions, encoders, codec types, codec configuration, bitrate and other characteristics. A single model for a deep learning-based post processing filter is unlikely to handle all the situations equally. As such, quality loss may be prevalent across different video sequences.

In view of these drawbacks, this disclosure describes scene adaptive and online learning techniques for updating the parameters of a post-processing filter network. In accordance with example techniques of this disclosure, a video capture device may encode video data and then may subsequently decode the video data to form reconstructed pictures. The video capture device may then process the reconstructed pictures with a post-processing filter network that is the same as a post-processing filter network that may be used at a video playback device. In particular, the video capture device may process the reconstructed picture with the post-processing filter network to determine a subset of parameters of the post-processing filter network to update.

In one example, the video capture device may use the original video data as ground truth and compare the filtered video data produced by applying the post-processing filter network to the reconstructed pictures to determine a loss function. The post-processing filter network may be trained based on this loss function. The video capture device may determine a subset of parameters of the post-processing filter network to update based on a result on this training. As one example, a certain percentage (e.g., 'n' percent) of parameters that have the largest accumulated gradient changes over the training process may be selected as parameters to update.

The video capture device may then update the values of the subset of parameters through a further training process, leaving all other parameters of the post-processing filter network fixed. The video capture device may then compress the updated parameters and send the compressed parameters to the video playback device along with the encoded video data. The video playback device may decode the encoded video data to form decoded video data. The video playback device may also decompress the updated parameters and then update the post-processing filter network of the video playback device with the updated parameters. The video playback device may then process the decoded video data with the post-processing filter network using the updated parameters.

By updating the parameters of the post-processing filter network based on the actual content being encoded, the post-processing filter network can be adapted to the actual content being encoded (i.e., the post-processing network is scene adaptive). Furthermore, the update of the post-processing network is "online" in that it occurs while video data is being actively processed. This scene-adaptive and online update of parameters may achieve lower levels of distortion at lower bitrates compared to standard video decoding with no post-processing and compared to video decoding using a post-processing network with fixed parameters.

FIG. 1 is a block diagram illustrating an example video encoding and decoding system 100 that may perform the techniques of this disclosure. The techniques of this disclosure are generally directed to coding (encoding and/or decoding) video data as well as post-processing video data. In general, video data includes any data for processing a video. Thus, video data may include raw, unencoded video, encoded video, decoded (e.g., reconstructed) video, and video metadata, such as signaling data.

As shown in FIG. 1, system 100 includes a capture device 102 that provides encoded video data to be decoded and displayed by a playback device 116, in this example. In particular, capture device 102 provides the video data to playback device 116 via a computer-readable medium 110. Capture device 102 and playback device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, capture device 102 and playback device 116 may be equipped for wireless communication, and thus may be referred to as wireless communication devices.

In the example of FIG. 1, capture device 102 includes video source 104, memory 106, video encoder 200, parameter update unit 202, and output interface 108. Playback device 116 includes input interface 122, video decoder 300, post-processing filter network 302, memory 120, and display device 118. In accordance with this disclosure, video encoder 200 of capture device 102 and video decoder 300 of playback device 116 may be configured to apply the techniques for updating parameters of a post-processing filter network. Thus, capture device 102 represents an example of a video encoding device, while playback device 116 represents an example of a video decoding device. In other examples, a capture device and a playback device may include other components or arrangements. For example, capture device 102 may receive video data from an external video source, such as an external camera. Likewise, playback device 116 may interface with an external display device, rather than include an integrated display device.

System 100 as shown in FIG. 1 is merely one example. In general, any digital video encoding and/or decoding device may perform techniques for dating parameters of a post-processing filter network. Capture device 102 and playback device 116 are merely examples of such coding devices in which capture device 102 generates coded video data and updated parameters of a post-processing filter network for transmission to playback device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, capture device 102 and playback device 116 may operate in a substantially symmetrical manner such that each of capture device 102 and playback device 116 includes video encoding and decoding components. Hence, system 100 may support one-way or two-way video transmission between capture device 102 and playback device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of capture device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Capture device 102 may then output the encoded video data via output interface 108 onto computer-readable medium 110 for reception and/or retrieval by, e.g., input interface 122 of playback device 116.

Memory 106 of capture device 102 and memory 120 of playback device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data and updated parameters for post-processing filter network 302 from capture device 102 to playback device 116. In one example, computer-readable medium 110 represents a communication medium to enable capture device 102 to transmit encoded video data and updated parameters directly to playback device 116 in real-time, e.g., via a radio frequency network or computer-based network. Output interface 108 may modulate a transmission signal including the encoded video data and updated parameters, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from capture device 102 to playback device 116.

In some examples, capture device 102 may output encoded data and updated parameters from output interface 108 to storage device 112. Similarly, playback device 116 may access encoded data and updated parameters from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, capture device 102 may output encoded video data and updated parameters to file server 114 or another intermediate storage device that may store the encoded video data and updated parameters generated by capture device 102. Playback device 116 may access stored video data from file server 114 via streaming or download.

File server 114 may be any type of server device capable of storing encoded video data and updated parameters and transmitting that encoded video data and updated parameters to the playback device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Playback device 116 may access encoded video data and updated parameters from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data and updated parameters, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data and updated parameters, according to other wireless standards, such as an IEEE 802.11 specification, an IEEE 802.15 specification (e.g., ZigBee™), a Bluetooth™ standard, or the like. In some examples, capture device 102 and/or playback device 116 may include respective system-on-a-chip (SoC) devices. For example, capture device 102 may include an SoC device to perform the functionality attributed to video encoder 200 and/or output interface 108, and playback device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of playback device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, iLBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use a post-processing filter network.

In general, video encoder 200 and video decoder 300 may perform block-based coding of pictures. The term "block"

generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUS having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

Any of the video encoding or video decoding processes described above may be performed using a neural network (NN). Additionally or alternatively, a neural network may be trained to efficiently compress video data without necessarily separately performing prediction and residual coding. Studies have shown that embedding neural networks into the hybrid video coding framework of video encoder 200 and video decoder 300 can improve compression efficiency. Neural networks may be used for intra prediction and inter prediction to improve the prediction efficiency. NN-based in-loop filtering and/or post-filtering have also performed well in heuristic testing.

For example, video encoder 200 and video decoder may use one or more NN-based filters for existing filters, such as deblocking filters, sample adaptive offset (SAO), and/or adaptive loop filtering (ALF). NN-based filters can also be applied exclusively, where NN-based filters are designed to replace all of the existing filters. Additionally or alternatively, NN-based filters may be designed to supplement, enhance, or replace any or all of the other filters.

In some examples, an NN-based filter may be a convolutional neural network (CNN)-based filter with multiple layers. An NN-based filtering process may take reconstructed samples as inputs, and may add the intermediate outputs back to the inputs to refine the input samples. The NN-based filter may use all color components (e.g., Y, U, and V, or Y, Cb, and Cr) as inputs 172 to exploit cross-component correlations. Different color components may share the same filters (including network structure and model parameters) or each component may have its own specific filters.

The filtering process can also be generalized as follows:

$$R'(i, j) = R(i, j) + \text{NN\_filter\_residual\_ouput}(R)$$

Here, R(i,j) represents a reconstructed sample at position (i,j) in the picture, R'(i, j) represents the filtered version of the reconstructed sample, and NN_filter_residaul_output(R) represents the intermediate samples discussed above that are calculated by the NN filter. The model structure and model parameters of NN-based filter(s) can be pre-defined and be stored at video encoder 200 and video decoder 300. The filters can also be signaled in the bitstream.

In some examples, an NN-based filter may include a series of feature extraction layers, followed by an output convolution. The feature extraction layers may include a 3×3 convolution (conv) layer followed by a parametric rectified linear unit (PRELU) layer. The convolutional layer applies a convolution operation to the input data, which involves a filter or kernel processing the input data (e.g., the reconstruction samples) in a sliding window fashion and computing dot products at each position. The convolution operation essentially captures local patterns within the input data. For example, in the context of image processing, these patterns could be edges, textures, or other visual features. The filter or kernel is a small matrix of weights that gets updated during the training process. By sliding this filter across the input data (or feature map from a previous layer) and computing the dot product at each position, the convolutional layer creates a feature map that encodes spatial hierarchies and patterns detected in the input. The output of a convolutional layer is a set of feature maps, each corresponding to one filter, capturing different aspects of the input data. This layer helps the neural network to learn increasingly complex and abstract features as the data passes through deeper layers of the network.

The PRELU layer is an activation function used in neural networks, and is a variant of the ReLU (Rectified Linear Unit) activation function. As described above, the convolution layer outputs feature maps, each corresponding to one filter, representing detected features in the input. Following the convolution layer, the PRELU layer applies the PRELU activation function to each element of the feature maps produced by the convolution layer. For positive values, the PRELU layer acts like a standard ReLU, passing the value through. For negative values, instead of setting them to zero (e.g., as ReLU does), the PRELU layer allows a small, linear, negative output. This keeps neurons of the NN active and maintains the gradient flow, which can be beneficial for learning in deep networks.

When NN-based filtering is applied in video coding, the whole video signal (pixel data) may be split into multiple processing units (e.g., 2D blocks), and each processing unit can be processed separately or be combined with other information associated with this block of pixels. For example, a processing unit may be a frame, a slice/tile, a CTU, or any pre-defined or signaled shapes and sizes. Typically, NN-based filtering is performed on reconstructed blocks of video data. Here, reconstructed blocks and samples may refer to both decoded blocks produced by video decoder 300, as well blocks reconstructed in a reconstruction loop of video encoder 200.

To further improve the performance of NN-based filtering, different types of input data can be processed jointly to produce the filtered output. Input data may include, but is not limited to, reconstruction pixels/samples, prediction pixels/samples, pixels/samples after the loop filter(s), partitioning structure information, deblocking parameters (e.g., boundary strength (BS)), quantization parameter (QP) values, slice or picture types, or a filters applicability or coding modes map. Input data can be provided at different granularities. Luma reconstruction and prediction samples may be provided at the original resolution, whereas chroma samples may be provided at lower resolution, e.g., for 4:2:0 representation, or can be up-sampled to the Luma resolution to achieve per-pixel representation. Similarly, QP, BS, partitioning, or coding mode information can be provided at lower resolution, including cases with a single value per frame, slice or processing block (e.g., QP). In other examples, QP, BS, partitioning, or coding mode information can be expanded (e.g., replicated) to achieve per-pixel/sample representation.

To further improve the performance of NN-based filtering, multi-mode solutions can be used. For example, for each processing unit, video encoder 200 may select a mode from a set of modes based on rate-distortion optimization and signal the selected mode in the bit-stream. The different modes may include different NN models, different values that may be used as the input information of the NN models, etc. In one example, video encoder 200 and video decoder 300 may use an NN-based filtering solution with multiple modes based on a single NN model by using different QP values as input to the NN model for different modes.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, capture device 102 may transport the bitstream to playback device 116 substantially in real time, or not in real time, such as might occur when storing syntax elements to storage device 112 for later retrieval by playback device 116.

As shown in FIG. 1, playback device 116 may further include a post-processing filter network 302. Post-processing filter network 302 may be a deep-learning based model, such as a convolutional neural network (CNN), that is designed to provide further filtering (e.g., in addition to any filtering performed within video decoder 300) to decoded pictures to further improve the quality of decoded pictures to be displayed. Unlike an "in-loop" filter used in video decoder 300, the output of post-processing filter network 302 is not used as reference pictures in the decoding process.

In one example, post-processing filter network 302 may be a U-Net. A U-Net has a convolutional neural network (CNN) architecture. However, post-processing filter network 302 may be any type of deep learning-based network configured to filter images, including fully convolutional networks (FCNs), generative adversarial networks (GANs), residual networks (ResNets), and attention U-Nets.

Post-processing filter network 302 may operate according to a plurality of parameters that have been trained for an image filtering process. As one example, the parameters of U-Net may include learnable weights and biases associated with the convolutional filters that make up the network. The parameters of post-processing filter network 302 may be adjusted during offline training to minimize a loss function, allowing the network to learn how to transform input images into filtered outputs effectively.

Weights in post-processing filter network 302 are the values assigned to each element of the convolutional filters (kernels) applied to the input data at various layers. For each convolutional layer, there may be multiple filters, and each filter has its set of weights. These weights determine how different regions of an input feature map are combined to produce the output of the next layer. During offline training, the weights are adjusted to emphasize important features like edges, textures, and patterns while suppressing less relevant information. The size of the weight matrix for each filter is determined by the kernel size (e.g., 3×3 or 5×5) and the number of input and output channels. For example, a convolutional layer with 32 output channels (filters) and a kernel size of 3×3 would have a weight matrix of size 3×3×(input channels)×32.

Biases are additional parameters added to the output of the convolutional operation to allow the model of post-processing filter network 302 to have more flexibility and better fit the data. A filter in a convolutional layer may have an associated bias. The bias parameter helps the network learn even when all input features are zero, providing a baseline value for activation. The bias is a scalar added to each element of the output feature map after applying the convolution and the weights. Like weights, biases are adjusted during training to minimize the error in the network's predictions.

As discussed above, existing deep learning-based post processing methods are deployed as stand-alone components and are often sub-optimal, as such post processing methods handle various use-cases that include varying content, resolution, sensors, light conditions, encoders, codec types, codec configuration, bitrate and other characteristics. A single model with fixed parameters for a deep learning-based post processing filter is unlikely to handle all the situations equally. As such, quality loss may be prevalent across different video sequences.

In view of these drawbacks, this disclosure describes scene adaptive and online learning techniques for updating the parameters of a post-processing filter network. In particular, capture device 102 may include a parameter update unit 202, which may include the same post-processing filter network as playback device 116. Parameter update unit 202 is configured to update the parameters of post-processing filter network 302 using scene-adaptive and online learning techniques.

In the context of video post-processing, scene-adaptive learning and online learning refer to advanced techniques for improving video quality and performance by adapting to the dynamic nature of video content. Scene-adaptive learning involves tailoring processing algorithms to the specific characteristics of different scenes within a video sequence. This means that instead of applying a one-size-fits-all approach (e.g., fixed parameters for post-processing filter network 302), parameter update unit 202 may be configured update a subset (or all) of the parameters of post-processing filter network 302 based on the unique features of each picture or sequence of pictures. For example, a video sequence may contain scenes with varying levels of brightness, contrast, motion, and texture. Scene-adaptive learning includes determining these differences and applying more optimal processing techniques (e.g., updating parameters) accordingly. This can lead to better results in terms of noise reduction, detail enhancement, and color correction, as post-processing filter network 302 may be more fine-tuned to the specific requirements of each picture or sequence of pictures.

Online learning in video post-processing refers to the ability of parameter update unit 202 to continuously update or periodically update and improve the parameters of post-processing filter network 302 as new video data is processed. Unlike traditional batch learning methods, where the system is trained on a static set of data, online learning allows for real-time adaptation. As the video stream progresses, parameter update unit 202 can learn from the incoming data, refining its models to better handle the specific characteristics of the current video picture or sequence. This may be particularly useful for live video feeds or applications where the video content is constantly changing, such as automotive systems or live broadcasts. Online learning better ensures that the processing system remains effective and efficient, even as the nature of the video content evolves.

In this regard, parameter update unit 202 is configured to use one or more compressed pictures generated video encoder 200, as well as their corresponding original pictures (e.g., as ground truth) to fine tune parameters post-processing filter network 302. Parameter update unit 202 may fine tune (e.g., update) one or more parameters of the network using gradient descent and/or forward-forward methods. While parameter update unit 202 may be configured to update all parameters of post-processing filter network 302, in other examples, parameter update unit 202 may be configured to determine a subset of the parameters that are most impactful to the end-to-end quality of the decoded picture. Parameter update unit 202 may update the selected subset of parameters and compress the updated parameters for transmission along with the encoded video bitstream. Playback device 116 may receive and decompress the updated parameters. Playback device 116 may then use the updated parameters in post-processing filter network 302. Post-processing filter network 302 may then use the updated parameters to remove compression artifacts and enhance quality of pictures decoded by video decoder 300.

As such, in accordance with the techniques of this disclosure which will be explained in more detail below, capture device 102 may be configured to encode a set of original pictures to create encoded video data, and decode the encoded video data to create a set of reconstructed pictures. Capture device 102 may be further configured to determine a subset of parameters to update from among a plurality of parameters of a post-processing filter network, including using the set of original pictures as ground truth and the set of reconstructed pictures as input to the post-processing filter network, and update the subset of parameters to generate updated parameters. Capture device 102 may then send the encoded video data and the updated parameters to playback device 116.

In a reciprocal fashion, playback device 116 may receive encoded video data and encoded parameters for a post-processing filter network, decode the encoded video data to generate a decoded picture, and decode the encoded parameters to recover updated parameters. Playback device 116 may then process the decoded picture using the post-processing filter network and the updated parameters to generate a filtered picture.

Figure 2:
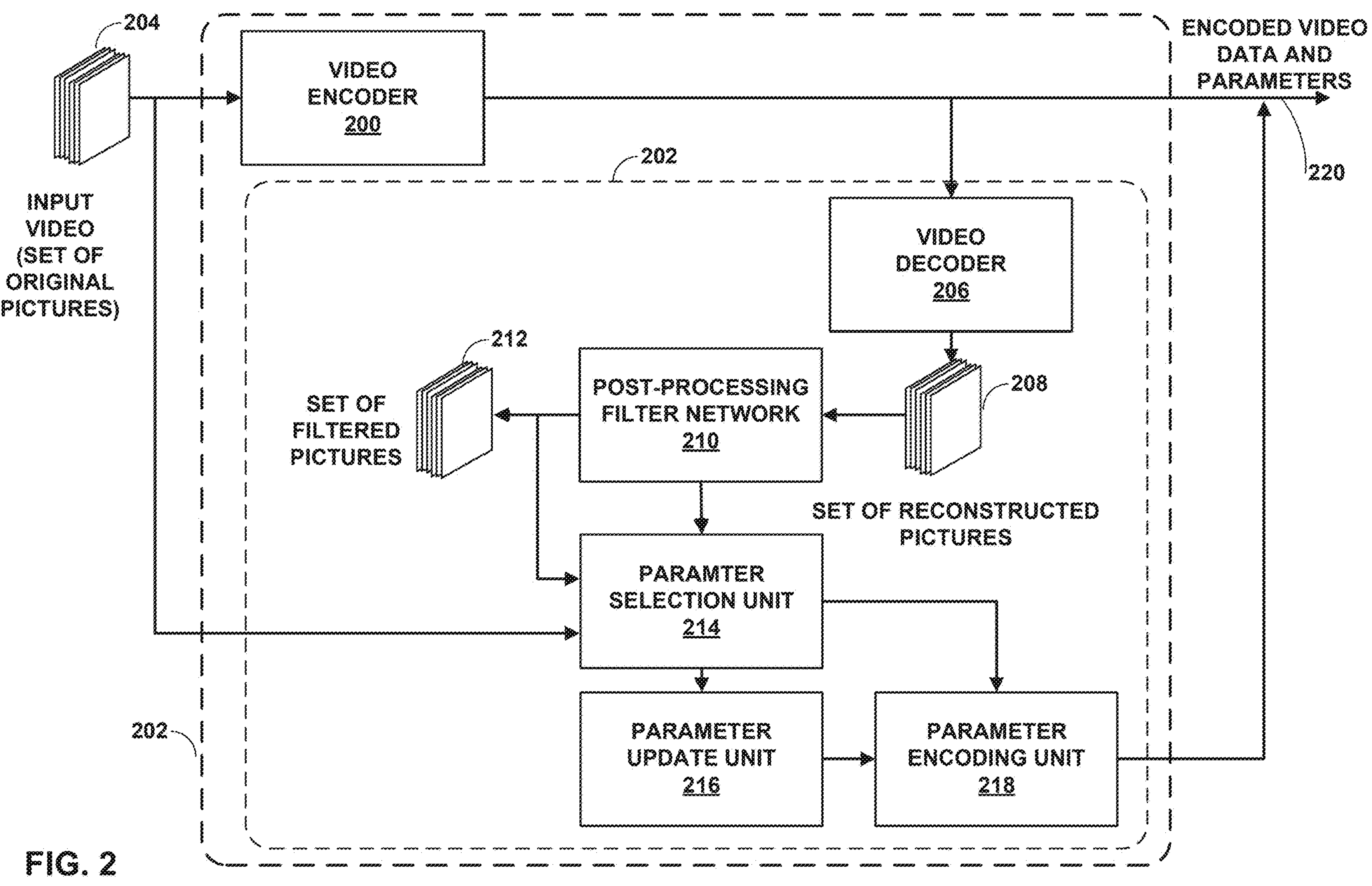
FIG. 2 is a block diagram illustrating an example capture device that may perform the techniques of this disclosure.

FIG. 2 is a block diagram illustrating an example capture device that may perform the techniques of this disclosure. FIG. 2 shows video encoder 200 and parameter update unit 202 of capture device 102. In this example, parameter update unit 202 may include video decoder 206, post-processing filter network 210, parameter selection unit 214, parameter update unit 216, and parameter encoding unit 218. The structure of FIG. 2 is just one example. In other examples, the functions of the various units of FIG. 2 may be separated or combined in different ways.

Initially, capture device 102 may receive input video data that includes a set of original pictures 204. That is, set of original pictures 204 are raw pictures that have yet to be processed. Video encoder 200 may encode the set of original pictures 204, as described above, to create encoded video data. In general, parameter update unit 202 may then use the encoded video data and the set of original pictures 204 (e.g., as ground truth), to determine and update a subset of parameters for a post-processing filter network 302 at playback device 116 that are most impactful to the end-to-end quality of the video data.

Parameter update unit 202 may use video decoder 206 to decode the encoded video data to create a set of reconstructed pictures 208. Video decoder 206 may configured to operate in the same manner as video decoder 300. As such, set of reconstructed pictures 208 will have the same compression artifacts as decoded video data produced by video decoder 300 at playback device 116. Parameter update unit 202 may then process the set of reconstructed pictures 208 using post-processing filter network 210 to produce a set of filtered pictures 212. Post-processing filter network 210 is the same as post-processing filter network 302 of playback device 116 (see FIG. 1).

By processing the set of reconstructed pictures 208 using post-processing filter network 210, parameter update unit 202 may determine a subset of parameters to update from among a plurality of parameters of post-processing filter network 210. In one example, the subset of parameters to update is less than all of the parameters. In other examples, the subset of parameters is all of the parameters of post-processing filter network 210. In general, parameter update unit 202 may use the set of original pictures 204 as ground truth and the set of reconstructed pictures 208 as input to post-processing filter network 210 in order to determine what subset of parameters to update. Parameter update unit 202 may perform a training process on post-processing filter network 210 to determine which parameters have the greatest impact on filtering the currently coded video data (e.g., the set of original pictures 204).

Parameter selection unit 214 of parameter update unit 202 may perform a training process that includes a forward pass and a backward pass. In a forward pass, post-processing filter network 210 processes the selected data (e.g., set of reconstructed pictures 208) from the input layer to the output layer. During this pass, parameter selection unit 214 computes predictions based on the current weights and biases. The output (e.g., a filtered picture from the set of filtered pictures 212) from the forward pass is compared with an original picture (e.g., from the set of original pictures 204) to calculate a loss. After computing the loss, parameter selection unit 214 network configured post-processing filter network 210 to perform a backward pass, where parameter selection unit 214 calculates gradients of the loss function with respect to each of the parameters (weights and biases). The backward pass may involve propagating the error backward through post-processing filter network 210, from the output layer to the input layer, to update the weights and biases using an optimization algorithm (such as gradient descent). This process of forward and backward passes may be repeated N times. N may be 10, 20, or another number of passes.

In one example of parameter selection, parameter selection unit 214 may perform N (e.g., 10) steps of forward and backward passes with the selected data. The selected data includes the set of original pictures 204 and the set of filtered pictures 212 produced by processing the set of reconstructed pictures 208 with post-processing filter network 210. Parameter selection unit 214 may then accumulate a respective gradient change for every parameter of the plurality of parameters of post-processing filter network 210 over the N forward and backward passes. Parameter selection unit 214 may then sort all of the accumulated gradient changes in a list, from largest gradient change to smallest gradient change. Parameter selection unit 214 may then select parameters associated with a top 'n' percent of the respective gradient changes in the list as the subset of parameters to be updated. As one example, the 'n' percent of parameters may be the top 1% of parameters with the largest accumulated gradient changes.

In one example of parameter selection, parameter selection unit 214 may perform N (e.g., 10) steps of forward and backward passes with the selected data. The selected data includes the set of original pictures 204 and the set of filtered pictures 212 produced by processing the set of reconstructed pictures 208 with post-processing filter network 210. Parameter selection unit 214 may then accumulate a respective gradient change for every parameter of the plurality of parameters of post-processing filter network 210 over the N forward and backward passes. Parameter selection unit 214 may then sort all of the accumulated gradient changes in a list, from largest gradient change to smallest gradient change. Parameter selection unit 214 may then select parameters associated with a top 'n' percent of the respective gradient changes in the list as the subset of parameters to be updated. As one example, the 'n' percent of parameters may be the top 1% of parameters with the largest accumulated gradient changes.

In another example of parameter selection, parameter selection unit 214 may again perform N (e.g., 10) steps of forward and backward passes with the selected data. The selected data includes the set of original pictures 204 and the set of filtered pictures 212 produced by processing the set of reconstructed pictures 208 with post-processing filter network 210. Parameter selection unit 214 may then accumulate a respective gradient change for every parameter of the plurality of parameters of post-processing filter network 210 over the N forward and backward passes. Parameter selection unit 214 may further determine a respective accumulated gradient change ratio for every parameter of the plurality of parameters. The respective accumulated gradient change ratio is a function of the respective gradient change divided by a magnitude of a respective parameter.

Parameter selection unit 214 may then sort all of the accumulated gradient change ratios in a list, from largest gradient change ratio to smallest gradient change ratio. Parameter selection unit 214 may then select parameters associated with a top 'n' percent of the respective accumulated gradient change ratios in the list as the subset of parameters to be updated. As one example, the 'n' percent of parameters may be the top 1% of parameters with the largest accumulated gradient changes.

In each of the above examples, the 'n' percent of parameters that are updated may be a tunable factor. A larger percent of parameters selected for updating may improve the quality of output images in post-processing filter network 302 of playback device 116, but may increase overhead signaling. In some examples, rather than selecting a fixed 'n' percent of parameters to update, parameter selection unit 214 may select all parameters having an accumulated gradient change over a certain threshold for updating. Once the number of parameters are determined, parameter selection unit 214 may calculate what 'n' percent of the total parameters the updated parameters represents. As will be discussed in more detail below, the value of 'n' may be used as an arithmetic parameter for arithmetic coding of the updated parameters.

In another example, rather than determining the subset of parameters through a training process, parameter selection unit 214 may randomly select 'n' percent of the plurality of parameters as the subset of parameters to update. In still another example, rather than determining the subset of parameters through a training process, parameter selection unit 214 may select 'n' percent of contiguous parameters starting from a last layer of post-processing filter network 210.

After parameter selection unit 214 determines the subset of parameters to update, parameter update unit 216 may then "fine-tune" or update those parameters. Parameter update unit 216 may updated the selected subset of parameters using gradient descent and/or a forward-forward method using selected frames (e.g., set of original pictures 204) in real-time capture. Three possible examples for parameter updating are described below. However, any process for updating the parameters (e.g., weights and biases) of a network model may be used. In each of the examples below, parameter update unit 216 may be configured to only update the subset of parameters selected by parameter selection unit 214. All other parameters remain fixed at their previous values. That is parameter update unit 216 will not update values of the plurality of parameters that are not in the subset of parameters.

In one example, parameter update unit 216 may perform a forward gradient method for updating the subset of parameters. Parameter update unit 216 may be configured to perform a forward gradient method in situations where capture device 102 is not configured for backward training. In general, a forward gradient method, when used without back propagation, involves approximating gradients using forward differences rather than computing the gradients exactly through the chain rule, as in traditional backpropagation.

In one example forward gradient method, instead of calculating the gradient of the loss function with respect to each parameter (e.g., weight and bias) using backpropagation, parameter update unit 216 may estimate these gradients by perturbing the parameters slightly and observing the resulting change in the loss function. For example, parameter update unit 216 may generate Gaussian noise with the same size as the subset of parameter selected for updating. First, parameter update unit 216 may perform a standard forward pass on post-processing filter network 210 with the current parameters plus the noise, and may compute the output and the corresponding loss. Then, parameter update unit 216 may perform a standard forward pass on post-processing filter network 210 with the current parameters minus the noise, computing the output and the corresponding loss+− Parameter update unit 216 determines the change in the loss function, and approximates the gradient as a function of the Gaussian noise and the two losses (e.g., abs (Gaussian noise)*sign(loss+−loss)). Once the gradient for each parameter of the selected subset is estimated, parameter update unit 216 may update the subset of parameters using an optimization algorithm such as stochastic gradient descent (SGD).

In another example, parameter update unit 216 may perform a back propagation method or a combination of forward and backward training for updating the subset of parameters. For each training step with batch size B (e.g., 100), parameter update unit 216 may run b (e.g., 90) samples with forward gradients and B-b (e.g., 100−90=10) samples with backward gradients and obtain the weighted gradients (0.9*forward_gradient+0.1*backward_gradient). Then, parameter update unit 216 may use an optimization algorithm to update the parameters, such as SGD.

The output of parameter update unit 216 are new parameter values for the subset of parameters selected to be updated. Parameter encoding unit 218 may then encode (e.g., compress) data that indicates the new values of the parameters as well as which parameters have been updated. Capture device 102 may then send the encoded video data and the updated parameters to playback device 116.

Figure 3:
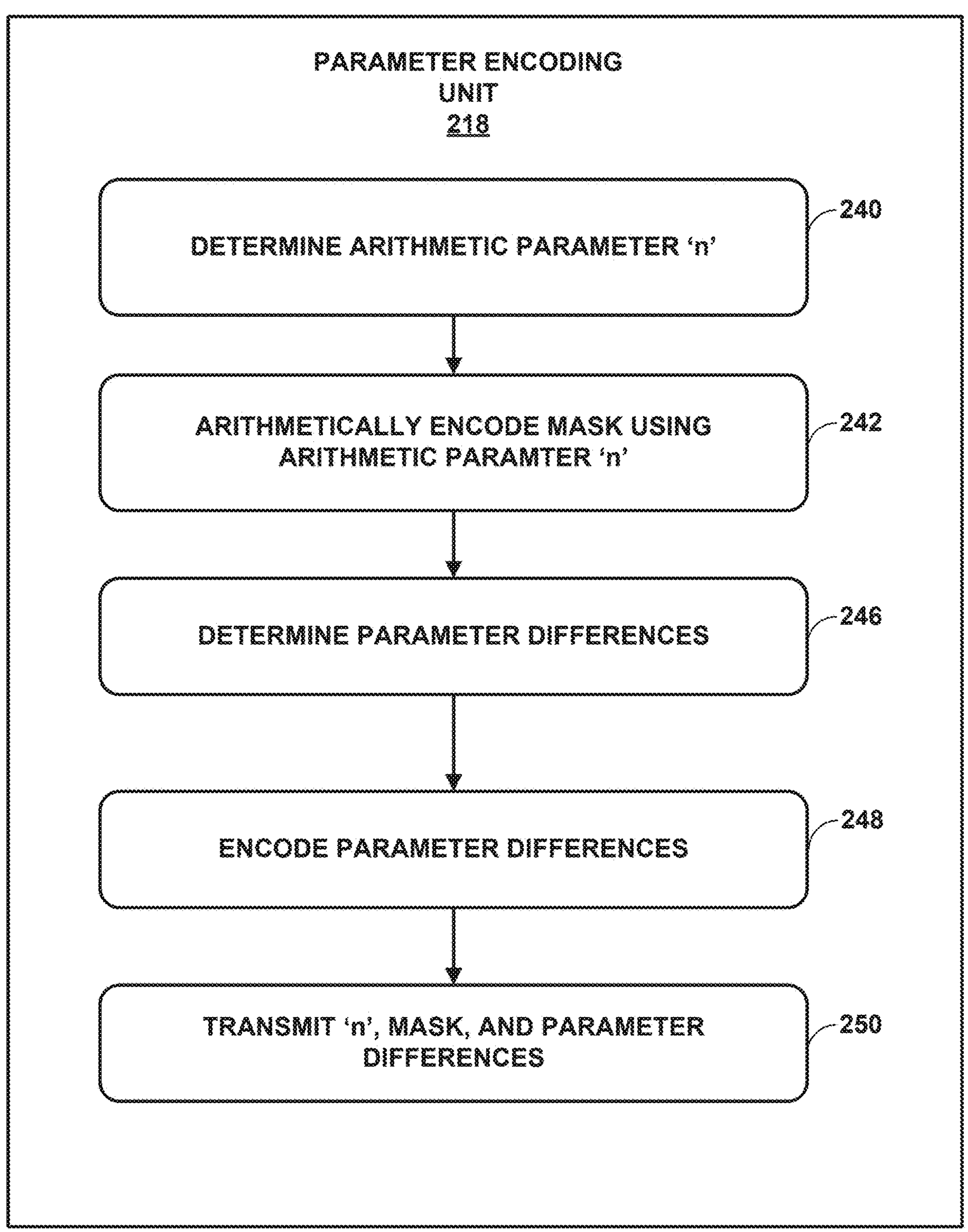
FIG. 3 is a block diagram illustrating an example parameter encoding unit that may perform the techniques of this disclosure.

FIG. 3 is a block diagram illustrating an example parameter encoding unit 218 that may perform the techniques of this disclosure. Parameter encoding unit 218 may first determine an arithmetic parameter 'n' (240). As described above, arithmetic parameter 'n' is based on a percentage of updated parameters to a total number of the plurality of parameters of the post-processing filter network. Arithmetic parameter 'n' is a probability used in arithmetic coding of the updated parameters. In particular, parameter encoding unit 218 may arithmetically encode a mask using arithmetic parameter 'n' (242). The mask is a string of 0s and 1s, where each value of the mask indicates whether or not a parameter in the post-processing filter network is the updated parameter. For example, a 1 value for a place in the mask indicates that the corresponding parameter is updated and a 0 value for a place in the mask indicates that the corresponding parameter is not updated.

Parameter encoding unit 218 may then determine parameter differences (246) between the current values of the selected subset of parameters and the update values for those parameters determined by parameter update unit 216. That is, parameter encoding unit 218 may determine a respective parameter difference between a respective updated parameter and a corresponding parameter of the subset of parameters. Parameter encoding unit 218 may then encode the respective parameters differences for the updated parameters (248) and transmit (250) the updated parameters (e.g., the value of 'n', the arithmetically coded mask, and the parameter differences) to playback device 116. In one example, parameter encoding unit 218 may encode the value of 'n' as a floating point number (e.g., with 32 bits). Parameter encoding unit 218 may encode the parameter differences using a particular bit depth, such as 8 bits or 16 bits.

In the encoder side examples above, in addition to sending the information indicating the updated parameters ('n', mask, and parameter differences), parameter update unit 202 may also send information indicating which frame playback device 116 should start using the updated parameters.

Furthermore, capture device 102 may be configured to update the parameters of post-processing filter network 302 at different granularities of time. In one example, capture device 102 may be configured to update the parameters for every frame. In some examples, parameter update unit 202 may compute new parameters for every frame, but may only send new parameters if the change in parameter values is greater than some predetermined threshold.

In other examples, capture device 102 may be configured to update the parameters once for every group of N frames (e.g., 200 frames). As one example, the set of original pictures 204 may be the first N images (e.g., 200 or another amount) in a sequence. In another example, the set of original pictures 204 used for updating the parameters may be a uniformly selected set of N images (e.g., 200 frames or another amount) in a video sequence.

In other examples, capture device 102 may be configured to update the parameters based for N number of images based on a detection of a content change (e.g., a scene change) or when there is some change in the distortion level of an image (e.g., a detection of a distortion level below a threshold). For example, capture device 102 may update the parameters based on a signal-to-noise ratio (e.g., a peak signal-to-noise (PSNR) ratio) between two pictures being large than a threshold.

Figure 4:
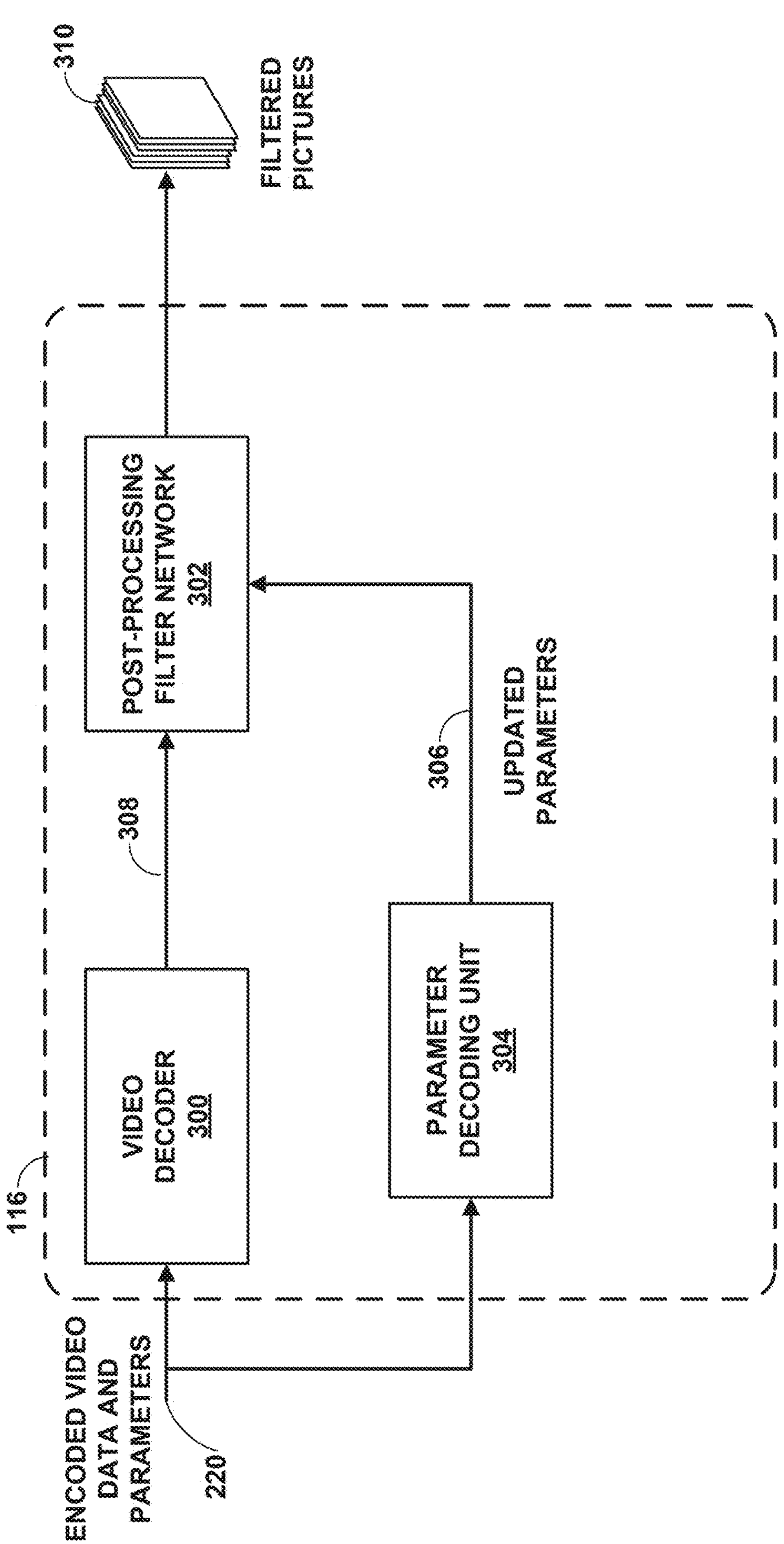
FIG. 4 is a block diagram illustrating an example playback device that may perform the techniques of this disclosure.

FIG. 4 is a block diagram illustrating an example playback device that may perform the techniques of this disclosure. FIG. 4 shows an example of playback device 116 in accordance with the techniques of this disclosure.

Playback device 116 is configured to receive encoded video data and encoded parameters 220. The encoded parameters are updated parameters generated by capture device 102 for use with post-processing filter network 302. Playback device 116 may use video decoder 300, as described above, to decode the encoded video data and create decoded pictures 308.

Playback device 116 may further include parameter decoding unit 304 configured to decode the encoded parameters to recover updated parameters 306. Playback device 116 may then update the parameters of post-processing filter network 302 with the updated parameters. Once updated, playback device 116 may process decoded pictures 308 using post-processing filter network 302 and the updated parameters to generate filtered picture 310. Filtered pictures 310 may then be displayed or stored for future use.

Figure 5:
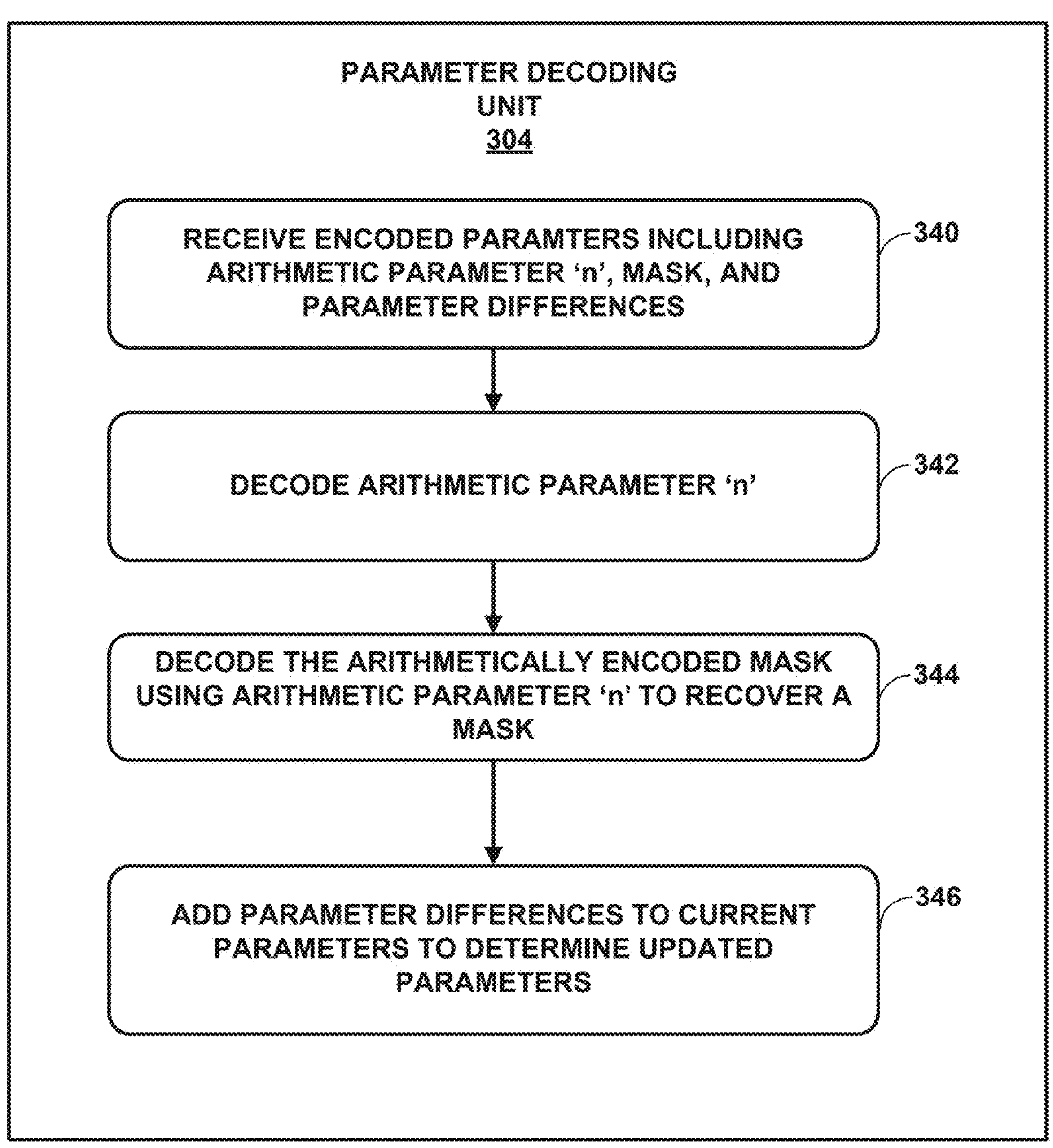
FIG. 5 is a block diagram illustrating an example parameter decoding unit that may perform the techniques of this disclosure.

FIG. 5 is a block diagram illustrating an example parameter decoding unit 304 that may perform the techniques of this disclosure. Parameter decoding unit 304 may receive the encoded parameters (340). The encoded parameters may include an arithmetic parameter 'n', an arithmetically encoded mask, and a respective parameter difference for each of the updated parameters.

Parameter decoding unit 304 may decode the arithmetic parameter 'n' (342) and then arithmetically decode the arithmetically encoded mask using arithmetic parameter 'n' to recover a mask (344). As described above, each value of the mask indicates whether or not a parameter in the post-processing filter network is the updated parameter. Parameter decoding unit 304 may then add the respective parameter difference to a corresponding parameter value of the post-processing filter network based on the mask to recover the updated parameters (346).

Figure 6:
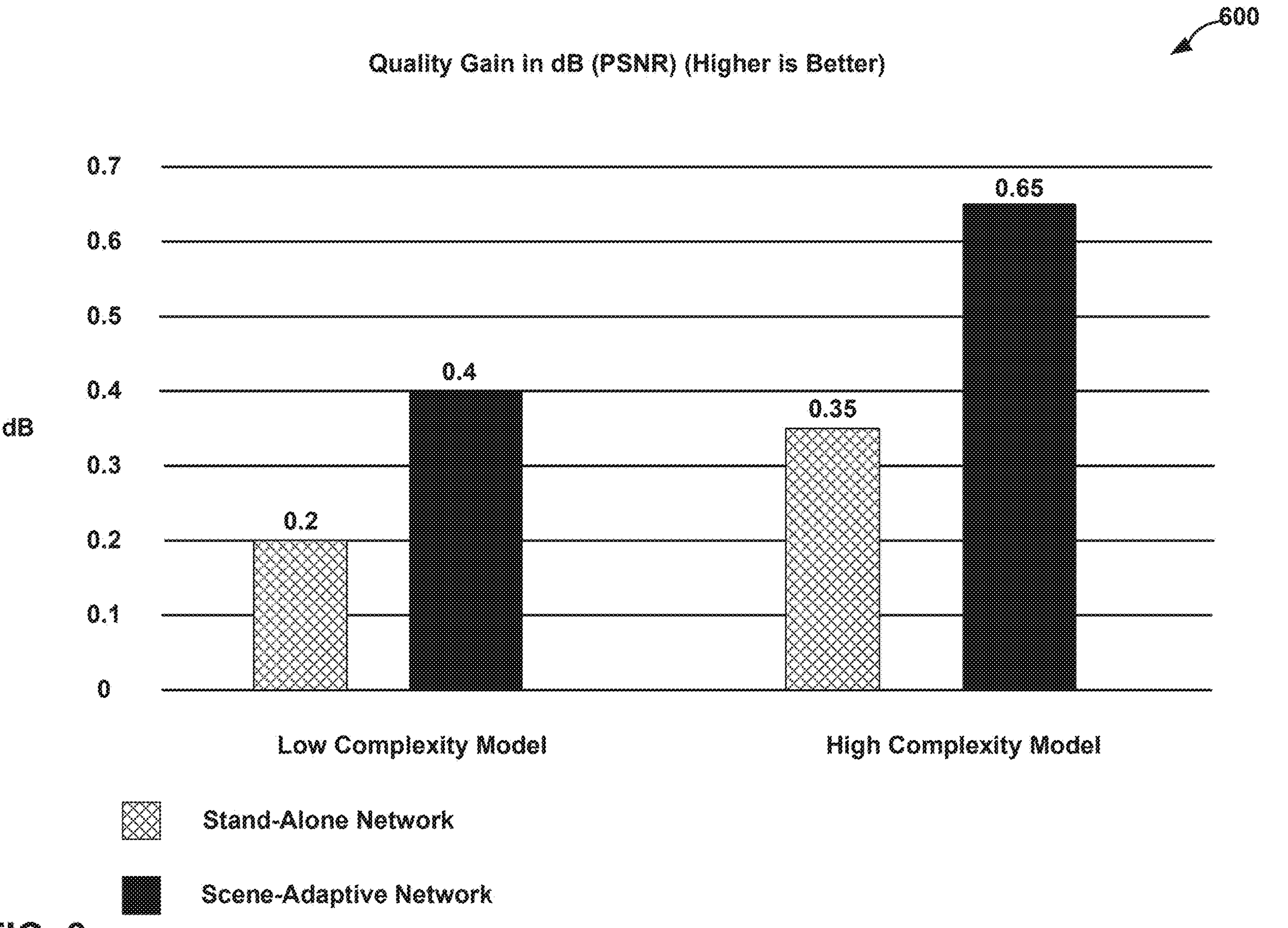
FIG. 6 illustrates example distortion performance associated with the techniques of this disclosure.

FIG. 6 illustrates example distortion performance associated with the techniques of this disclosure. FIG. 6 shows quality gain in dB (PSNR) for both a stand-alone network (e.g., post-processing filter network with fixed parameters), and a scene-adaptive network (e.g., a post-processing filter network with parameters updated using the techniques of this disclosure). FIG. 6 also shows results for both a low complexity model for the filter network, and a high complexity model for the filter network. The low complexity model was tested on video data at 720p resolution at 30 frames per second (fps). The high complexity model was tested on video data at 540*p* resolution at 30 fps. In one example test, the low complexity model had a size of 4 MB and the high complexity model had a size of 7 MB. The updated parameters were typically less than 150 KB for an example video sequence. For scene adaptation, only 1000 steps and 40-200 images were needed in testing.

As a baseline, PSNR improvement between the H.264 standard and the H.265 was around 2.5-3 dB, with a bitrate savings of around 60%. As shown in FIG. 6, the dB gain in quality from using a stand-alone network with a low complexity model was 0.2 dB over a standard video codec with no post-processing network. The dB gain in quality from using the scene-adaptive network of this disclosure was 0.4 dB over a standard video codec with no post-processing network.

Gains in quality were measured to be even higher when a high complexity model was used. The dB gain in quality from using a stand-alone network with a high complexity model was 0.35 dB over a standard video codec with no post-processing network. The dB gain in quality from using the scene-adaptive network of this disclosure was 0.65 dB over a standard video codec with no post-processing network.

Figure 7:
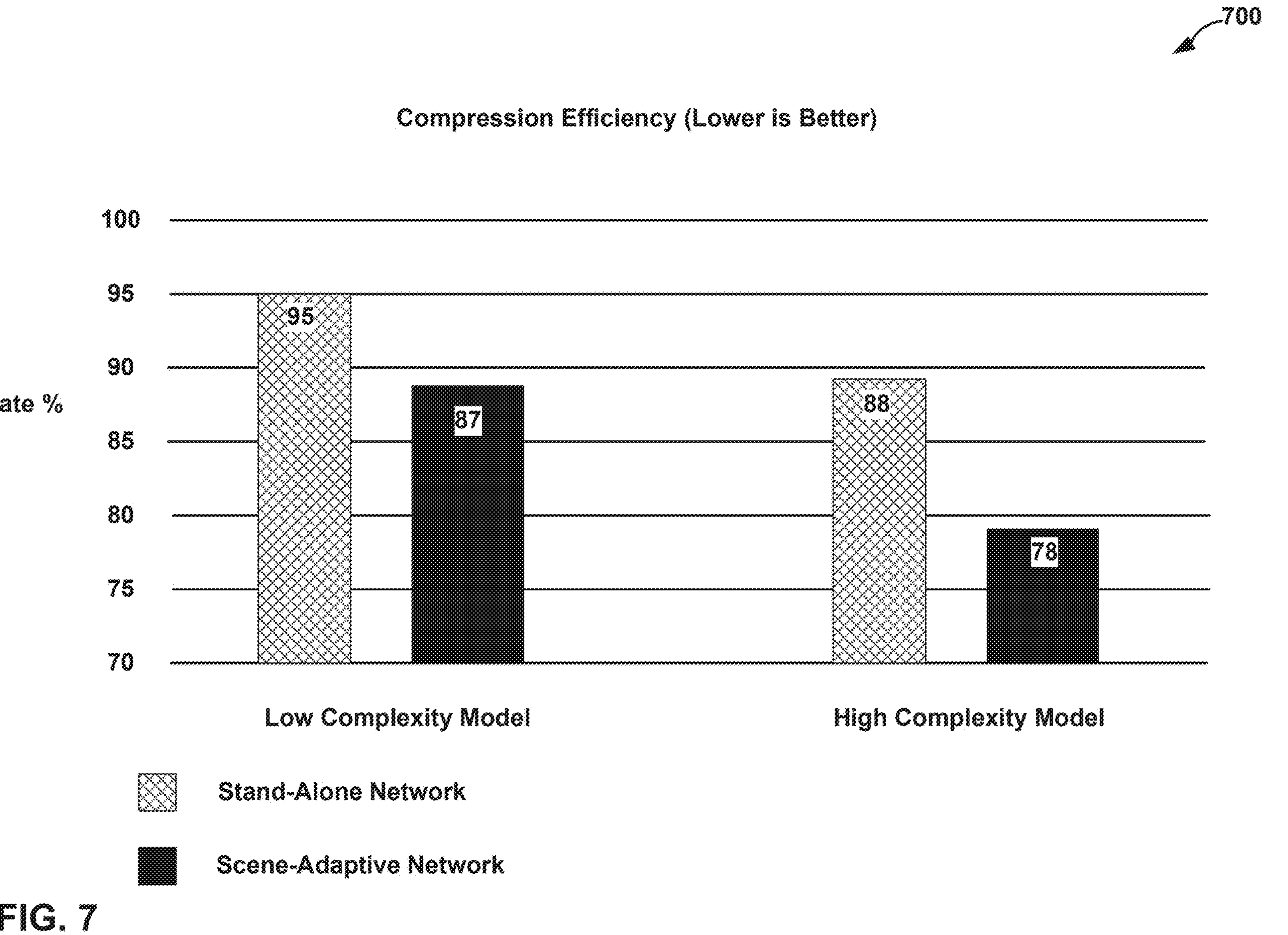
FIG. 7 illustrates example bitrate performance associated with the techniques of this disclosure.

FIG. 7 illustrates example bitrate performance associated with the techniques of this disclosure. As shown in FIG. 7, the bitrate percentage reduction from using a stand-alone network with a low complexity model was 95% less than a standard video codec with no post-processing network. That is, the stand-alone network could achieve the same quality as a video codec with no post-processing network with just 95% of the bitrate. The bitrate percentage reduction from using the scene-adaptive network of this disclosure was 87% less than a standard video codec with no post-processing network.

Bitrate reductions were even greater when a high complexity model was used. The bitrate percentage reduction from using a stand-alone network with a high complexity model was 88% less than a standard video codec with no post-processing network. The bitrate percentage reduction from using the scene-adaptive network of this disclosure was 78% less than a standard video codec with no post-processing network.

While the techniques of this disclosure may be used with any video coding uses cases, the increase in quality and reductions in bitrate needed may be particularly useful for bandwidth and memory limited applications, such as automotive, mobile, extended reality (XR) and Internet-of-Things (IoT) applications.

Figure 8:
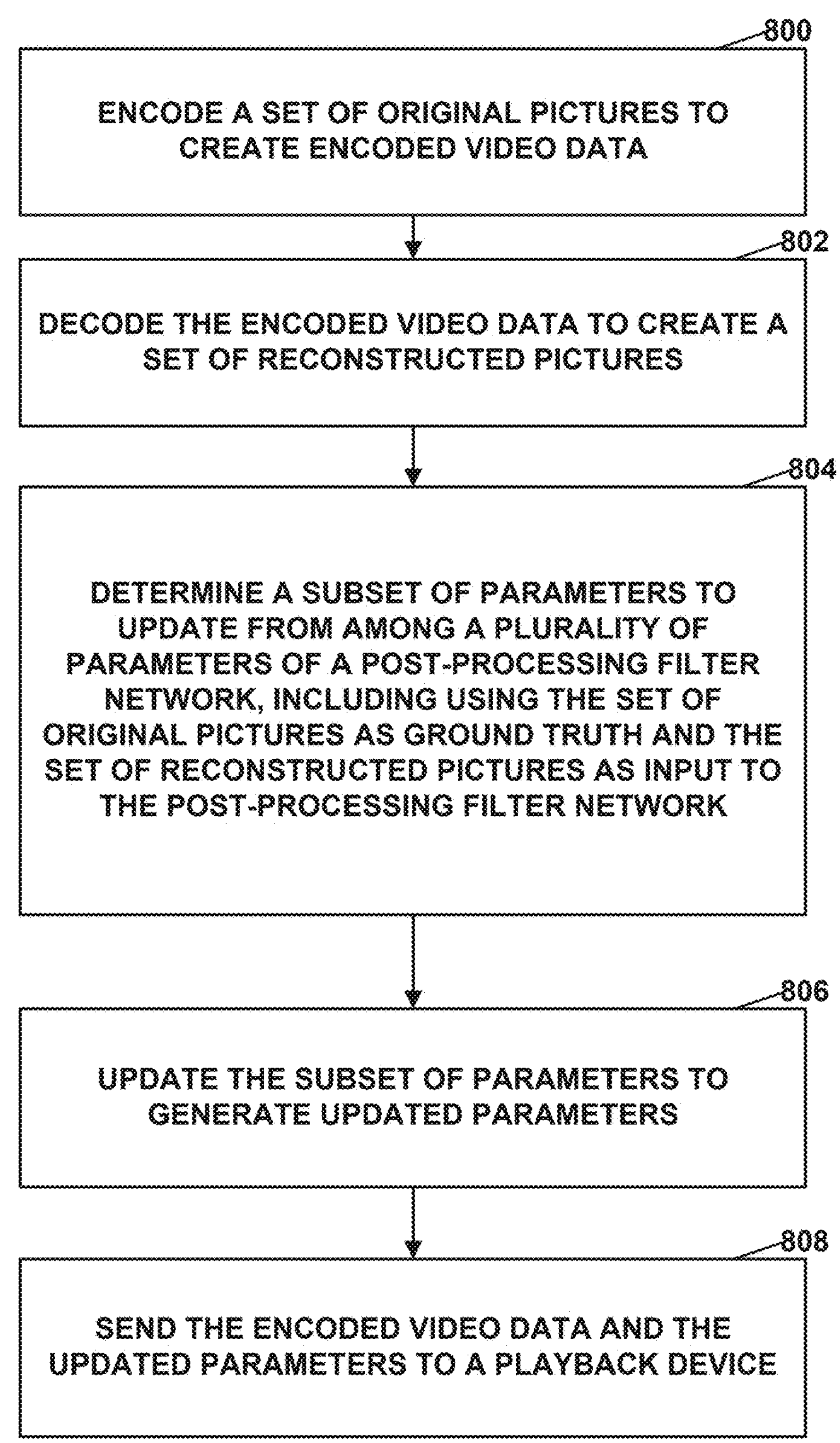
FIG. 8 is a flowchart illustrating an example process at a capture device in accordance with the techniques of this disclosure.

FIG. 8 is a flowchart illustrating an example process at a capture device in accordance with the techniques of this disclosure. The techniques of FIG. 8 may be performed by one or more structural units of capture device 102, including parameter update unit 202 and video encoder 200.

In one example of the disclosure, capture device 102 may be configured to encode a set of original pictures to create encoded video data (800), and then decode the encoded video data to create a set of reconstructed pictures (802). In one example, the set of original pictures is one of a first number pictures in a sequence, or a uniformly selected first number of pictures in a sequence. In another example, capture device 102 is further configured to select one or more pictures for the set of original pictures based on a change in signal-to-noise ratio between pictures. In another example, capture device 102 is further configured to select one or more pictures for the set of original pictures based on a scene change.

Capture device 102 may further determine a subset of parameters to update from among a plurality of parameters of a post-processing filter network, including using the set of original pictures as ground truth and the set of reconstructed pictures as input to the post-processing filter network (804). Capture device 102 may then update the subset of parameters to generate updated parameters (806), and send the encoded video data and the updated parameters to a playback device (808).

In one example, to determine the subset of parameters to update, capture device 102 is further configured to accumulate a respective gradient change for every parameter of the plurality of parameters over N forward and backward passes, sort the respective gradient changes in a list, and select parameters associated with a top 'n' percent of the respective gradient changes in the list as the subset of parameters.

In another example, to determine the subset of parameters to update, capture device 102 is further configured to accumulate a respective gradient change for every parameter of the plurality of parameters over N forward and backward passes, determine a respective accumulated gradient change ratio for every parameter of the plurality of parameters, wherein the respective accumulated gradient change ratio is a function of the respective gradient change divided by a magnitude of a respective parameter, sort the respective accumulated gradient change ratios in a list, and select parameters associated with a top 'n' percent of the respective accumulated gradient change ratios in the list as the subset of parameters.

In another example, to determine the subset of parameters to update, capture device 102 is further configured to randomly select 'n' percent of the plurality of parameters as the subset of parameters, or select 'n' percent of contiguous parameters starting from a last layer of the post-processing filter network.

In another example to update the subset of parameters to generate updated parameters, capture device 102 is configured to perform one or more of a forward gradient method, back propagation, or a mixture of forward and backward training to update the subset of parameters. In one example, capture device 102 is further configured to not update values of the plurality of parameters that are not in the subset of parameters.

In a further example, capture device 102 may be configured to compress the updated parameters. For example, to compress the updated parameters, capture device 102 is configured to determine an arithmetic parameter 'n' based on a percentage of updated parameters to a total number of the plurality of parameters of the post-processing filter network, wherein arithmetic parameter 'n' is a probability used in arithmetic coding of the updated parameters, arithmetically encode a mask using arithmetic parameter 'n', wherein each value of the mask indicates whether or not a parameter in the post-processing filter network is the updated parameter, determine a respective parameter difference between a respective updated parameter and a corresponding parameter of the subset of parameters, and encode the respective parameters differences for the updated parameters.

Figure 9:
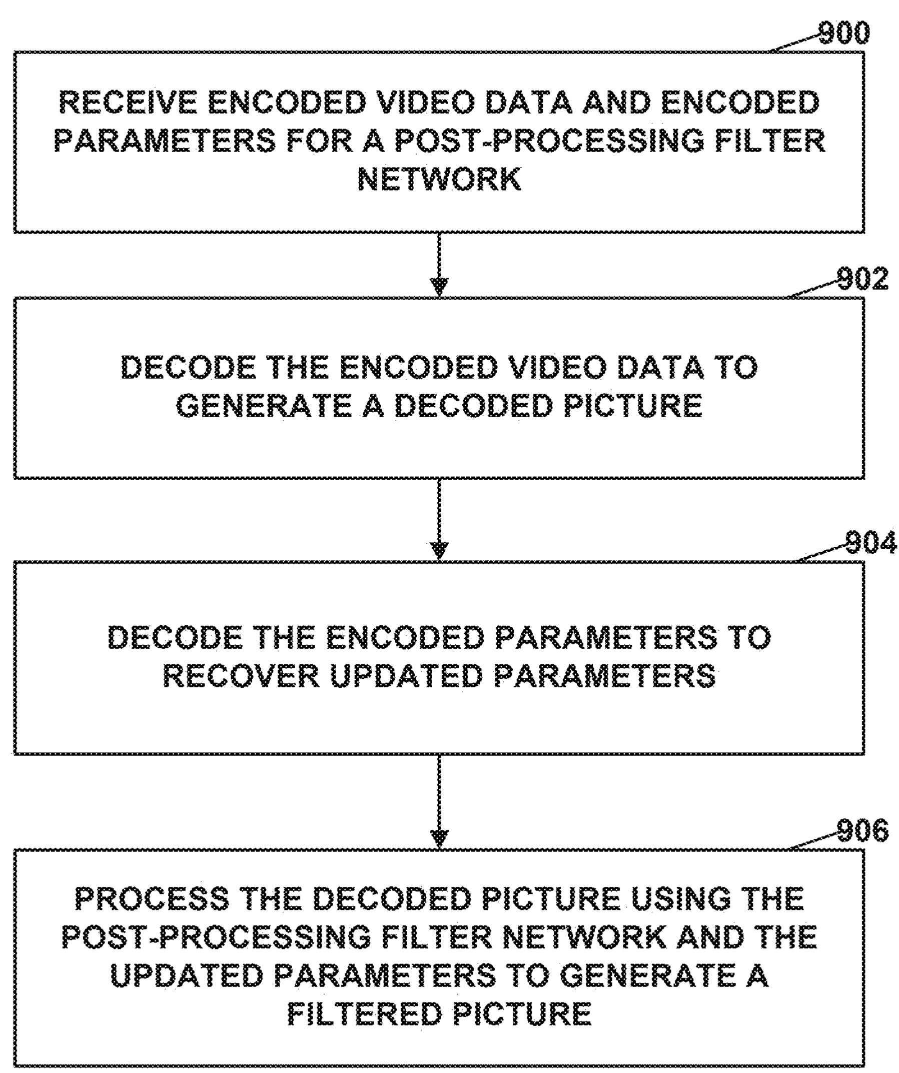
FIG. 9 is a flowchart illustrating an example process at a playback device in accordance with the techniques of this disclosure.

FIG. 9 is a flowchart illustrating an example process at a playback device in accordance with the techniques of this disclosure. The techniques of FIG. 9 may be performed by one or more structural units of playback device 116, including video decoder 300 and post-processing filter network 302.

In one example the disclosure, playback device 116 may be configured to receive encoded video data and encoded parameters for a post-processing filter network (900). Playback device 116 may decode the encoded video data to generate a decoded picture (902), and decode the encoded parameters to recover updated parameters (904). Playback device 116 may be further configured to process the decoded picture using the post-processing filter network and the updated parameters to generate a filtered picture (906).

In one example, the encoded parameters include an arithmetic parameter 'n', an arithmetically encoded mask, and a respective parameter difference for each of the updated parameters. To decode the encoded parameters, playback device 116 may be further configured to decode the arithmetic parameter 'n'. arithmetically decode the arithmetically encoded mask using arithmetic parameter 'n' to recover a mask, wherein each value of the mask indicates whether or not a parameter in the post-processing filter network is the updated parameter, and add the respective parameter difference to a corresponding parameter value of the post-processing filter network based on the mask to recover the updated parameters.

The following numbered clauses illustrate one or more aspects of the devices and techniques described in this disclosure.

Aspect 1. A method of processing video data at a capture device, the method comprising: encoding a set of original pictures to create encoded video data; decoding the encoded video data to create a set of reconstructed pictures; determining a subset of parameters to update from among a plurality of parameters of a post-processing filter network, including using the set of original pictures as ground truth and the set of reconstructed pictures as input to the post-processing filter network; updating the subset of parameters to generate updated parameters; and sending the encoded video data and the updated parameters to a playback device.

Aspect 2. The method of Aspect 1, wherein determining the subset of parameters to update comprises: accumulating a respective gradient change for every parameter of the plurality of parameters over N forward and backward passes; sorting the respective gradient changes in a list; and selecting parameters associated with a top 'n' percent of the respective gradient changes in the list as the subset of parameters.

Aspect 3. The method of Aspect 1, wherein determining the subset of parameters to update comprises: accumulating a respective gradient change for every parameter of the plurality of parameters over N forward and backward passes; determining a respective accumulated gradient change ratio for every parameter of the plurality of parameters, wherein the respective accumulated gradient change ratio is a function of the respective gradient change divided by a magnitude of a respective parameter; sorting the respective accumulated gradient change ratios in a list; and selecting parameters associated with a top 'n' percent of the respective accumulated gradient change ratios in the list as the subset of parameters.

Aspect 4. The method of Aspect 1, wherein determining the subset of parameters to update comprises one of: randomly selecting 'n' percent of the plurality of parameters as the subset of parameters; or selecting 'n' percent of contiguous parameters starting from a last layer of the post-processing filter network.

Aspect 5. The method of any of Aspects 1-4, wherein updating the subset of parameters to generate updated parameters comprises: performing one or more of a forward gradient method, back propagation, or a mixture of forward and backward training to update the subset of parameters.

Aspect 6. The method of Aspect 5, further comprising: not updating values of the plurality of parameters that are not in the subset of parameters.

Aspect 7. The method of any of Aspects 1-6, wherein the set of original pictures is one of a first number pictures in a sequence, or a uniformly selected first number of pictures in a sequence.

Aspect 8. The method of any of Aspects 1-7, further comprising: selecting one or more pictures for the set of original pictures based on a change in signal-to-noise ratio between pictures.

Aspect 9. The method of any of Aspects 1-7, further comprising: selecting one or more pictures for the set of original pictures based on a scene change.

Aspect 10. The method of any of Aspects 1-9, further comprising: compressing the updated parameters.

Aspect 11. The method of Aspect 10, wherein compressing the updated parameters comprises: determining an arithmetic parameter 'n' based on a percentage of updated parameters to a total number of the plurality of parameters of the post-processing filter network, wherein arithmetic parameter 'n' is a probability used in arithmetic coding of the updated parameters; arithmetically encoding a mask using arithmetic parameter 'n', wherein each value of the mask indicates whether or not a parameter in the post-processing filter network is the updated parameter; determining a respective parameter difference between a respective updated parameter and a corresponding parameter of the subset of parameters; and encoding the respective parameters differences for the updated parameters.

Aspect 12. The method of any of Aspects 1-11, wherein the post-processing filter network is a convolutional neural network.

Aspect 13. An apparatus configured to process video data at a capture device, the apparatus comprising: a memory; and processing circuitry in communication with the memory, the processing circuitry configured to: encode a set of original pictures to create encoded video data; decode the encoded video data to create a set of reconstructed pictures; determine a subset of parameters to update from among a plurality of parameters of a post-processing filter network, including using the set of original pictures as ground truth and the set of reconstructed pictures as input to the post-processing filter network; update the subset of parameters to generate updated parameters; and send the encoded video data and the updated parameters to a playback device.

Aspect 14. The apparatus of Aspect 13, wherein to determine the subset of parameters to update, the processing circuitry is further configured to: accumulate a respective gradient change for every parameter of the plurality of parameters over N forward and backward passes; sort the respective gradient changes in a list; and select parameters associated with a top 'n' percent of the respective gradient changes in the list as the subset of parameters.

Aspect 15. The apparatus of Aspect 13, wherein to determine the subset of parameters to update, the processing circuitry is further configured to: accumulate a respective gradient change for every parameter of the plurality of parameters over N forward and backward passes; determine a respective accumulated gradient change ratio for every parameter of the plurality of parameters, wherein the respective accumulated gradient change ratio is a function of the respective gradient change divided by a magnitude of a respective parameter; sort the respective accumulated gradient change ratios in a list; and select parameters associated with a top 'n' percent of the respective accumulated gradient change ratios in the list as the subset of parameters.

Aspect 16. The apparatus of Aspect 13, wherein to determine the subset of parameters to update, the processing circuitry is further configured to: randomly select 'n' percent of the plurality of parameters as the subset of parameters; or select 'n' percent of contiguous parameters starting from a last layer of the post-processing filter network.

Aspect 17. The apparatus of any of Aspects 13-16, wherein to update the subset of parameters to generate updated parameters, the processing circuitry is configured to: perform one or more of a forward gradient method, back propagation, or a mixture of forward and backward training to update the subset of parameters.

Aspect 18. The apparatus of Aspect 17, wherein the processing circuitry is further configured to: not update values of the plurality of parameters that are not in the subset of parameters.

Aspect 19. The apparatus of any of Aspects 13-18, wherein the set of original pictures is one of a first number pictures in a sequence, or a uniformly selected first number of pictures in a sequence.

Aspect 20. The apparatus of any of Aspects 13-19, wherein the processing circuitry is further configured to: select one or more pictures for the set of original pictures based on a change in signal-to-noise ratio between pictures.

Aspect 21. The apparatus of any of Aspects 13-19, wherein the processing circuitry is further configured to: select one or more pictures for the set of original pictures based on a scene change.

Aspect 22. The apparatus of any of Aspects 13-21, wherein the processing circuitry is further configured to: compress the updated parameters.

Aspect 23. The apparatus of Aspect 22, wherein to compress the updated parameters, the processing circuitry is configured to: determine an arithmetic parameter 'n' based on a percentage of updated parameters to a total number of the plurality of parameters of the post-processing filter network, wherein arithmetic parameter 'n' is a probability used in arithmetic coding of the updated parameters; arithmetically encode a mask using arithmetic parameter 'n', wherein each value of the mask indicates whether or not a parameter in the post-processing filter network is the updated parameter; determine a respective parameter difference between a respective updated parameter and a corresponding parameter of the subset of parameters; and encode the respective parameters differences for the updated parameters.

Aspect 24. The apparatus of any of Aspects 13-23, wherein the post-processing filter network is a convolutional neural network.

Aspect 25. The apparatus of any of Aspects 13-24, further comprising: a camera configured to capture the set of original pictures.

Aspect 26. A method of processing video data at a playback device, the method comprising: receiving encoded video data and encoded parameters for a post-processing filter network; decoding the encoded video data to generate a decoded picture; decoding the encoded parameters to recover updated parameters; and processing the decoded picture using the post-processing filter network and the updated parameters.

Aspect 27. The method of Aspect 26, wherein the encoded parameters include an arithmetic parameter 'n', an arithmetically encoded mask, and a respective parameter difference for each of the updated parameters, and wherein decoding the encoded parameters comprises: decoding the arithmetic parameter 'n'; arithmetically decoding the arithmetically encoded mask using arithmetic parameter 'n' to recover a mask, wherein each value of the mask indicates whether or not a parameter in the post-processing filter network is the updated parameter; and adding the respective parameter difference to a corresponding parameter value of the post-processing filter network based on the mask to recover the updated parameters.

Aspect 28. An apparatus configured to process video data at a playback device, the apparatus comprising: a memory; and processing circuitry in communication with the memory, the processing circuitry configured to: receive encoded video data and encoded parameters for a post-processing filter network; decode the encoded video data to generate a decoded picture; decode the encoded parameters to recover updated parameters; and process the decoded picture using the post-processing filter network and the updated parameters to generate a filtered picture.

Aspect 29. The apparatus of Aspect 28, wherein the encoded parameters include an arithmetic parameter 'n', an arithmetically encoded mask, and a respective parameter difference for each of the updated parameters, and wherein to decode the encoded parameters, the processing circuitry is further configured to: decode the arithmetic parameter 'n'; arithmetically decode the arithmetically encoded mask using arithmetic parameter 'n' to recover a mask, wherein each value of the mask indicates whether or not a parameter in the post-processing filter network is the updated parameter; and add the respective parameter difference to a corresponding parameter value of the post-processing filter network based on the mask to recover the updated parameters.

Aspect 30. The apparatus of any of Aspects 28-29, further comprising: a display configured to display the filtered picture.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data at a capture device, the method comprising:

encoding a set of original pictures to create encoded video data;

decoding the encoded video data to create a set of reconstructed pictures;

determining a subset of parameters to update from among a plurality of parameters of a post-processing filter network, including using the set of original pictures as ground truth and the set of reconstructed pictures as input to the post-processing filter network, wherein determining the subset of parameters to update comprises:

accumulating a respective gradient change for every parameter of the plurality of parameters over N forward and backward passes;

sorting the respective gradient changes in a list; and selecting parameters associated with a top 'n' percent of the respective gradient changes in the list as the subset of parameters;

updating the subset of parameters to generate updated parameters; and sending the encoded video data and the updated parameters to a playback device.

2. The method of claim 1, wherein determining the subset of parameters to update comprises:

accumulating a respective gradient change for every parameter of the plurality of parameters over N forward and backward passes;

determining a respective accumulated gradient change ratio for every parameter of the plurality of parameters, wherein the respective accumulated gradient change ratio is a function of the respective gradient change divided by a magnitude of a respective parameter;

sorting the respective accumulated gradient change ratios in a list; and selecting parameters associated with a top 'n' percent of the respective accumulated gradient change ratios in the list as the subset of parameters.

3. The method of claim 1, wherein determining the subset of parameters to update comprises one of:

randomly selecting 'n' percent of the plurality of parameters as the subset of parameters; or selecting 'n' percent of contiguous parameters starting from a last layer of the post-processing filter network.

4. The method of claim 1, wherein updating the subset of parameters to generate updated parameters comprises:

performing one or more of a forward gradient method, back propagation, or a mixture of forward and backward training to update the subset of parameters.

5. The method of claim 4, further comprising:

not updating values of the plurality of parameters that are not in the subset of parameters.

6. The method of claim 1, wherein the set of original pictures is one of a first number pictures in a sequence, or a uniformly selected first number of pictures in a sequence.

7. The method of claim 1, further comprising:

selecting one or more pictures for the set of original pictures based on a change in signal-to-noise ratio between pictures.

8. The method of claim 1, further comprising:

selecting one or more pictures for the set of original pictures based on a scene change.

9. The method of claim 1, further comprising:

compressing the updated parameters.

10. The method of claim 9, wherein compressing the updated parameters comprises:

determining an arithmetic parameter 'n' based on a percentage of updated parameters to a total number of the plurality of parameters of the post-processing filter network, wherein arithmetic parameter 'n' is a probability used in arithmetic coding of the updated parameters;

arithmetically encoding a mask using arithmetic parameter 'n', wherein each value of the mask indicates whether or not a parameter in the post-processing filter network is the updated parameter;

determining a respective parameter difference between a respective updated parameter and a corresponding parameter of the subset of parameters; and encoding the respective parameters differences for the updated parameters.

11. The method of claim 1, wherein the post-processing filter network is a convolutional neural network.

12. An apparatus configured to process video data at a capture device, the apparatus comprising:

a memory; and processing circuitry in communication with the memory, the processing circuitry configured to:

encode a set of original pictures to create encoded video data;

decode the encoded video data to create a set of reconstructed pictures;

determine a subset of parameters to update from among a plurality of parameters of a post-processing filter network, including using the set of original pictures as ground truth and the set of reconstructed pictures as input to the post-processing filter network, wherein to determine the subset of parameters to update, the processing circuitry is further configured to:

accumulate a respective gradient change for every parameter of the plurality of parameters over N forward and backward passes;

sort the respective gradient changes in a list; and select parameters associated with a top 'n' percent of the respective gradient changes in the list as the subset of parameters;

update the subset of parameters to generate updated parameters; and send the encoded video data and the updated parameters to a playback device.

13. The apparatus of claim 12, wherein to determine the subset of parameters to update, the processing circuitry is further configured to:

accumulate a respective gradient change for every parameter of the plurality of parameters over N forward and backward passes;

determine a respective accumulated gradient change ratio for every parameter of the plurality of parameters, wherein the respective accumulated gradient change ratio is a function of the respective gradient change divided by a magnitude of a respective parameter;

sort the respective accumulated gradient change ratios in a list; and select parameters associated with a top 'n' percent of the respective accumulated gradient change ratios in the list as the subset of parameters.

14. The apparatus of claim 12, wherein to determine the subset of parameters to update, the processing circuitry is further configured to:

randomly select 'n' percent of the plurality of parameters as the subset of parameters; or select 'n' percent of contiguous parameters starting from a last layer of the post-processing filter network.

15. The apparatus of claim 12, wherein to update the subset of parameters to generate updated parameters, the processing circuitry is configured to:

perform one or more of a forward gradient method, back propagation, or a mixture of forward and backward training to update the subset of parameters.

16. The apparatus of claim 15, wherein the processing circuitry is further configured to:

not update values of the plurality of parameters that are not in the subset of parameters.

17. The apparatus of claim 12, wherein the set of original pictures is one of a first number pictures in a sequence, or a uniformly selected first number of pictures in a sequence.

18. The apparatus of claim 12, wherein the processing circuitry is further configured to:

select one or more pictures for the set of original pictures based on a change in signal-to-noise ratio between pictures.

19. The apparatus of claim 12, wherein the processing circuitry is further configured to:

select one or more pictures for the set of original pictures based on a scene change.

20. The apparatus of claim 12, wherein the processing circuitry is further configured to:

compress the updated parameters.

21. The apparatus of claim 20, wherein to compress the updated parameters, the processing circuitry is configured to:

determine an arithmetic parameter 'n' based on a percentage of updated parameters to a total number of the plurality of parameters of the post-processing filter network, wherein arithmetic parameter 'n' is a probability used in arithmetic coding of the updated parameters;

arithmetically encode a mask using arithmetic parameter 'n', wherein each value of the mask indicates whether or not a parameter in the post-processing filter network is the updated parameter;

determine a respective parameter difference between a respective updated parameter and a corresponding parameter of the subset of parameters; and encode the respective parameters differences for the updated parameters.

22. The apparatus of claim 12, wherein the post-processing filter network is a convolutional neural network.

23. The apparatus of claim 12, further comprising:

a camera configured to capture the set of original pictures.

24. A method of processing video data at a playback device, the method comprising:

receiving encoded video data and encoded parameters for a post-processing filter network, wherein the encoded parameters include an arithmetic parameter 'n', an arithmetically encoded mask, and a respective parameter difference for each of the updated parameters;

decoding the encoded video data to generate a decoded picture;

decoding the encoded parameters to recover updated parameters, wherein decoding the encoded parameters comprises:

decoding the arithmetic parameter 'n';

arithmetically decoding the arithmetically encoded mask using arithmetic parameter 'n' to recover a mask, wherein each value of the mask indicates whether or not a parameter in the post-processing filter network is the updated parameter; and adding the respective parameter difference to a corresponding parameter value of the post-processing filter network based on the mask to recover the updated parameters; and;

processing the decoded picture using the post-processing filter network and the updated parameters.

25. An apparatus configured to process video data at a playback device, the apparatus comprising:

a memory; and processing circuitry in communication with the memory, the processing circuitry configured to:

receive encoded video data and encoded parameters for a post-processing filter network, wherein the encoded parameters include an arithmetic parameter 'n', an arithmetically encoded mask, and a respective parameter difference for each of the updated parameters;

decode the encoded video data to generate a decoded picture;

decode the encoded parameters to recover updated parameters, wherein to decode the encoded parameters, the processing circuitry is further configured to:

decode the arithmetic parameter 'n'; arithmetically decode the arithmetically encoded mask using arithmetic parameter 'n' to recover a mask, wherein each value of the mask indicates whether or not a parameter in the post-processing filter network is the updated parameter; and add the respective parameter difference to a corresponding parameter value of the post-processing filter network based on the mask to recover the updated parameters; and process the decoded picture using the post-processing filter network and the updated parameters to generate a filtered picture.

26. The apparatus of claim 25, further comprising:

a display configured to display the filtered picture.

* * * * *